United States Patent

Breckenridge

[11] Patent Number: 6,117,672
[45] Date of Patent: Sep. 12, 2000

[54] MOVING BED BIOFILTER AND CONDENSER FOR FLUE GAS POLLUTANT REMOVAL AND COLLECTION

[76] Inventor: Leon Breckenridge, 16213 E. 22$^{nd}$, Veradale, Wash. 99037

[21] Appl. No.: 09/218,949

[22] Filed: Dec. 22, 1998

[51] Int. Cl.$^7$ ................................ C12S 5/00; C12M 1/16
[52] U.S. Cl. ..................... 435/266; 435/299.1; 55/354; 55/528; 95/275
[58] Field of Search .................... 435/266, 299.1; 55/267–269, 351, 354, 474, 528; 95/275, 276, 288–290

[56] References Cited

U.S. PATENT DOCUMENTS

| | | |
|---|---|---|
| 746,254 | 12/1903 | Baggaley . |
| 805,701 | 11/1905 | Baggaley . |
| 1,216,677 | 2/1917 | Feilmann et al. . |
| 4,406,676 | 9/1983 | Potter . |
| 4,723,968 | 2/1988 | Schippert et al. . |
| 4,927,435 | 5/1990 | Anson . |
| 5,110,329 | 5/1992 | Pieper . |
| 5,682,760 | 11/1997 | Hollingsworth . |
| 5,795,751 | 8/1998 | Apel . |

FOREIGN PATENT DOCUMENTS

| | | |
|---|---|---|
| 40 02 462 | 8/1991 | Germany . |
| 56-53728 | 5/1981 | Japan . |

Primary Examiner—William H. Beisner
Attorney, Agent, or Firm—Sratton Ballew PLLC

[57] ABSTRACT

A system for removing particulate, sulfur dioxide, nitrogenous oxides and other condensables from the flue gas of a coal, lignite, or other solid fuel combustor. The system can combine biomass filtration, anaerobic digestion, steam absorption refrigeration, and heat exchangers to minimize parasitic energy consumption, solid and liquid waste disposal and interference with combustion efficiency, while achieving near total reduction of contaminants without regard to sulfur or ash content of fuel. Gases at the exit of a multiclone of a fuel-combustor enter a waste heat boiler, generating low pressure steam that drives a steam absorption chiller. The flue gas which still contains small particulate material pass through a moving belt system conveying a mat of chopped biomass that can be impregnated with bacteria that feed on nitrogenous oxides. The mat is sufficiently thick and moist to entrap the remaining solids and smoke in the exhaust stream. The particulate-free flue gas passes through a staged heat exchanger which can utilize ambient air, pond water, and the refrigerated water from the steam absorption chiller to condense the water vapor in the exhaust stream. Sulfur oxides exits the flue gas stream with the condensed water vapor which can be processed in an anaerobic digester. Methanogenic bacteria within the digester can convert the mat and the acidic condensate into a biogas, a combination of methane and carbon dioxide, and plant growth media.

15 Claims, 6 Drawing Sheets

MOVING BED BIOFILTER AND CONDENSER FOR FLUE GAS POLLUTANT REMOVAL AND COLLECTION

TECHNICAL FIELD

The invention relates to a biofilter and heat removal system for the removal of pollutants from contaminated gas streams. More particularly the present invention relates to a method and apparatus for removing undesired pollutants from flue gases generated by the combustion of a fossil fuel, by utilizing a moving disposable filter of organic material and a series of process heat exchangers to further remove condensable components.

BACKGROUND OF THE INVENTION

The removal or reduction of noxious constituents of coal combustion products, or flue gas, has been attempted since the beginnings of the Industrial Revolution in eighteenth century England. Without air pollution controls, the combustion of coal produces significant quantities of carbon monoxide (CO), carbon dioxide ($CO_2$), oxides of nitrogen ($NO_x$), oxides of sulfur ($SO_x$), volatile organic compounds (VOC's), other hazardous air pollutants (HAP's), and fly ash, or particulate materials (PM). PM was the first targeted pollutant in flue gas, followed by $SO_x$ and $NO_x$. Currently, there is a global effort to limit emissions of $CO_2$, due to its role as a greenhouse gas.

Current air pollution (A/P) control technologies are primarily "segmental" in that there is a separate and distinct approach for limiting the emission of each deleterious constituent of the exhaust stream. The subsequent disposal of the resulting waste products for each pollutant creates separate waste streams. While the reduction of PM and $SO_x$ are typically achieved in the post combustion phase, and $NO_x$ emissions are typically treated during the combustion phase, some novel designs attempt to integrate $SO_x$ and $NO_x$ control within the combustion zone.

Conventional PM removal from post combustion flue gas emissions centers around the use of cyclonics; a method of removing ash via centrifugation and gravity. The flue gas passes through an array of cyclones called a multiclone. A collection system entraps and contains the ash, which must be periodically collected and disposed of as a hazardous waste.

There is little practical application for coal ash that is collected. Since it is considered a hazardous waste, so it cannot simply be dumped in a sanitary landfill. Furthermore, the ash content of coal differs from batch to batch, and is further complexed by a myriad of combustion variables, so it is difficult to optimize and simplify the operation of the multi clones. Multi clones operate by creating a zone of low pressure and draw electrical power for that purpose. It is difficult, if not impossible, to adjust the level of the pressure differential required to remove the ash under constantly changing conditions.

The multiclone is capable of efficiently removing PM above a specific density and size. However, finer, lighter PM remain in the flue gas stream. In order to prevent the lighter PM from being emitted from the stack, coal combusting facilities often employ electrostatic precipitators. Electrostatic precipitators maintain an electrical charge opposite to the ionization of the PM in the exhaust stream to draw the PM to an electrically charged grid. When the grid becomes coated with solids, it is cleaned, usually with a system employing hot, pressurized water or steam.

Cleaning electrostatic precipitators creates an ash slurry that must be treated and disposed. This process consumes water which must be heated and pressurized. The degree of ionization in the fine PM is in part determined by sulfur content in the coal, so the effectiveness of the grid in attracting PM may vary. Even when electrostatic precipitators work well to remove fly ash from the flue gas, they are not able to remove much of the "fine PM", typically defined as those particles with an aerodynamic diameter of less than 10 microns. To correct this shortfall wet scrubbing is added.

Another method of removing PM from flue gas resulting from solid fuel combustion is the baghouse. A baghouse is a chamber with a fabric filter through which flue gas is passed. The filter entrapped PM is then vacuumed out and disposed as hazardous waste.

Flue gas desulfurization (FGD) is the category name applied to the spectrum of technologies designed to chemically bond the flue gas $SO_x$, which is primarily sulfur dioxide ($SO_2$) in flue gas, to calcium, magnesium or other binders. FGD methods differ in the way in which calcium or other binders are delivered to the exhaust stream, and the subsequent treatment or disposition of the spent sorbent (calcium-containing compound). FGD technologies are categorized as wet, dry, or regenerable.

Wet FGD is a post combustion technology that uses either limestone or lime suspended in water as a medium through which the stack gases must pass. Flue gas is sprayed with the calcium-containing slurry which reacts with the $SO_x$ to form a wet, toxic sludge. The sludge formed by the activity of the wet scrubber must then be disposed.

Dry FGD utilizes a lime slurry or soda ash solution injected into a spray dryer. When the solution contacts the $SO_x$ in the flue gas the reactants form a dry waste, some of which can be converted into drywall, or gypsum board.

Regenerable FGD technologies such as the Wellman-Lord process employ a variety of chemical reactions to reclaim the $SO_x$ from the sorbent and convert the $SO_x$ into sulfuric acid, elemental sulfur, or other useful compounds. When purged of its sulfur content, the sorbent can then be reused.

All the variants of sorbent-based FGD are seriously flawed both conceptually and operationally. Sulfur oxides are a very small component of the stack gas mixture, typically comprising less than 0.05% of the mass flow, when excess combustion air is included. The flue gases are in a high entropy state and in motion, making it difficult to achieve the proper stoichiometry for the reaction to take place.

Sorbent-based FGD is, by its nature, a very inefficient way to remove $SO_2$ from flue gas. The preparation, mixing, and pumping of sorbents requires considerable horsepower. $SO_2$ removal rates are proportional to the amount of sorbent used and the energy requirements of circulating the sorbent. The flue gases, after being scrubbed, must be reheated for proper drafting. The parasitic energy requirements of a complete FGD and PM removal system can be approximately 4% to 7% of the total plant power output of an electrical generating facility.

The sludge or solid waste resulting from FGD are considered toxic and must be disposed of in a hazardous waste facility. Only a small percentage of the waste is converted into any useful product, which is primarily gypsum board products. Additionally, the gypsum products are low profit items. As a result, the energy costs of making sulfuric acid or elemental sulfur in the regenerable FGD process easily erases the slim profit margins generated in the sales of the gypsum by-products.

Furthermore, wet FGD and Wet Electrostatic Precipitators (WEPs) consume significant quantities of water. This is a highly undesirable feature, because the water must be further processed for recycle or discharge, at a premium cost. While most FGD technologies are post combustion processes, $NO_x$ reduction is achieved primarily through other modifications to the combustion environment.

Staged combustion operates by an initial reduction of the amount of air necessary to achieve complete combustion of the coal. The partial combustion releases nitrogen from the coal and is followed by a second stage that completes the combustion of the fuel. A widely utilized variant of staged combustion called Flue Gas Recirculation simply recycles and reburns a portion of the flue gases to the primary stage of the combustion process to lower the peak flame temperature and reduce the available oxygen, which favors a reduction in $NO_x$ emissions.

Low $NO_x$ burners are commonly designed to facilitate staged combustion in a way that minimizes the inefficiencies inherent in any method that interferes with the stoichiometry of the oxidation process. Low $NO_x$ burners employ a fuel rich primary zone and secondary burnout zone for combustion. Both air flow and fuel flow are split prior to entering the burner, effectively creating the two zones. Nitrogen is dissociated from the coal in the primary zone and does not readily oxidize. The fuel from the primary zone is then more completely oxidized in the secondary zone.

The primary problem with the conventional $NO_x$ reduction technology is that it interferes with the stoichiometry of combustion in an attempt to modify emissions at the expense of efficiency. Consequently, to achieve cleaner emissions some of the heat content of the fuel is lost due to incomplete oxidation and a resultant loss of fuel burning efficiency.

There are several novel technologies that attempt to reduce both $NO_x$ and $SO_x$ in the combustion zone. The Limestone Injection Multistage Burner (LIMB) combines staged combustion with limestone injection. The $SO_2$ combines with the limestone to create calcium sulfate. Removal rates of $SO_2$ are lower than with wet FGD, but the LIMB is a less expensive retrofit.

An offspring of LIMB technology is Atmospheric Fluidized Bed Combustion (AFDC). In this fluidized bed process, powdered coal and limestone are injected onto a bed of sand that is fluidized by streams of injected air. Combustion temperature is lowered to achieve $NO_x$ reduction, but higher $SO_2$ removal is achieved. Both LIMB and AFDC achieve $SO_2$ and $NO_x$ removal in the combustion zone at the cost of extensively impairing the stoichiometry of the fire and reducing efficiency.

Another relatively new control strategy is called Integrated Gasification Combined-Cycle Technology (IGCG). IGCG employs coal gasification to substantially reduce $SO_2$ emissions and powers a steam turbine with the flue gas to enhance efficiency. IGCG, however, is itself a thermochemical process depending on coal combustion and so is subject to the all the problems of direct coal burning.

In summation, there are a number of adverse consequences to the spectrum of technologies designed to reduce the levels of pollutants from the exhaust stream of coal combustion, all of which have significant and inherent problems, adding considerable capital, operating or disposal and waste treatment costs that make them undesirable.

PM removal and FGD produce large volumes of hazardous waste in separate streams which cannot be beneficially combined, especially when considered in proportion to fuel consumption and the ash and sulfur content of fuel. These post combustion emission mitigation technologies have considerable parasitic energy requirements that consume excess fuel and thereby raise greenhouse gas emissions per unit of available power. Mitigation efforts centering around the combustion zone impair the stoichiometry of the reaction, lowering boiler efficiency and raising levels of greenhouse gas emissions per unit of available power. Achieving higher removal rates of pollutants incurs higher energy penalties in the post combustion technologies and lowered stoichiometry in the combustion-based technologies. PM below a certain specific density and size cannot be removed with the current methods. All the mitigation technologies are expensive to implement, maintain, and operate; retrofitting installations adds to the expense. There is no direct or ancillary enhancement to the operation of coal combustors deriving from implementation of the current mitigation technologies.

SUMMARY OF INVENTION

The invention provides a biofiltration apparatus for removing air pollutants from a contaminated gas stream, such as a combustion gas stream. The present invention includes a filter for removing particulate material (PM) from a combustion gas stream. The filter, comprising of a continuous mat of a substantially organic material, is positioned completely across the combustion gas stream, to force all of the gas stream through the filter. The filter mounts on a movable filter frame, and the movable filter frame sequentially presents the continuous mat to the combustion gas stream. The combustion gas stream is then forced to pass through a portion of the continuous mat.

As a preferred alternative, the organic material is a fibrous material. The fibrous material is a wet and sticky fibrous material with a sufficient moisture content and surface area to entrain substantially all PM present in the flue gas. The combustion gas stream is generated from the combustion of a coal based fuel or other solid fuel. Also alternatively, the movable filter frame can be configured to return the continuous mat through the gas stream for a second pass.

As an additional alternative, a heat removal stage for condensing gaseous pollutants from the gas stream can be added downstream from the filter.

The primary goal of the gas emission clean-up system is to remove PM as small as one micron, without the use of complex and energy intensive systems. The other major target, when the heat removal stage is employed, is to reduce the exhaust temperature to 50° F. or lower. This assures that the $SO_2$ and other condensables have been removed from the exhaust gases.

According to one advantage of the invention all waste stream solids, liquids and gases can be processed in one common clean up system.

According to a related advantage of the invention all waste stream solids, liquids and gases are converted into non-hazardous and useful byproducts.

According to another advantage of the invention a reduction of parasitic energy utilization, which is encountered in typical energy plants, is achieved.

According to yet another advantage of the invention an enhancement of the combustion process is realized that results in improved boiler efficiency.

According to still another advantage of the invention a near total reclamation of targeted pollutants is achieved by using a process which requires no modifications to existing combustion equipment.

According to a related advantage of the invention, the efficiency of the invention is independent of the sulfur or ash content of the fuel.

According to another related advantage of the invention, costs are lowered in capitalization for implementation, retrofit, operation, and maintenance of pollution clean-up systems.

According to another advantage of the invention, water consumption is reduced by the elimination of water intensive pollution control devices and by a generation of water via condensation of water vapor from stack gases.

The purified gas product from the biofilter can then be condensed to precipitate any remaining gaseous pollutants. The present invention greatly reduces the emission of PM, as well as $SO_x$, $NO_x$, and other condensables from a coal based fuel or any other solid fuel, without regard to amount of sulfur, ash or other inorganic content originally present in the fuel. The biofilter is unaffected by the size of the PM and provides a near total reclamation of targeted pollutants using a process which requires no modification according to the sulfur or ash content of the fuel.

Another advantage of the present invention is that it allows an operator to enhance the stoichiometry of the combustion environment for improved boiler efficiency, without placing first priority for boiler firing on combustion modifying emission control strategies.

Still another advantage of the present invention is that it provides for consolidation of all waste streams into a single containment stream wherein those wastes are economically converted into a non-hazardous, useful byproduct.

DETAILED DESCRIPTION OF SPECIFIC EMBODIMENTS

Figure 1:
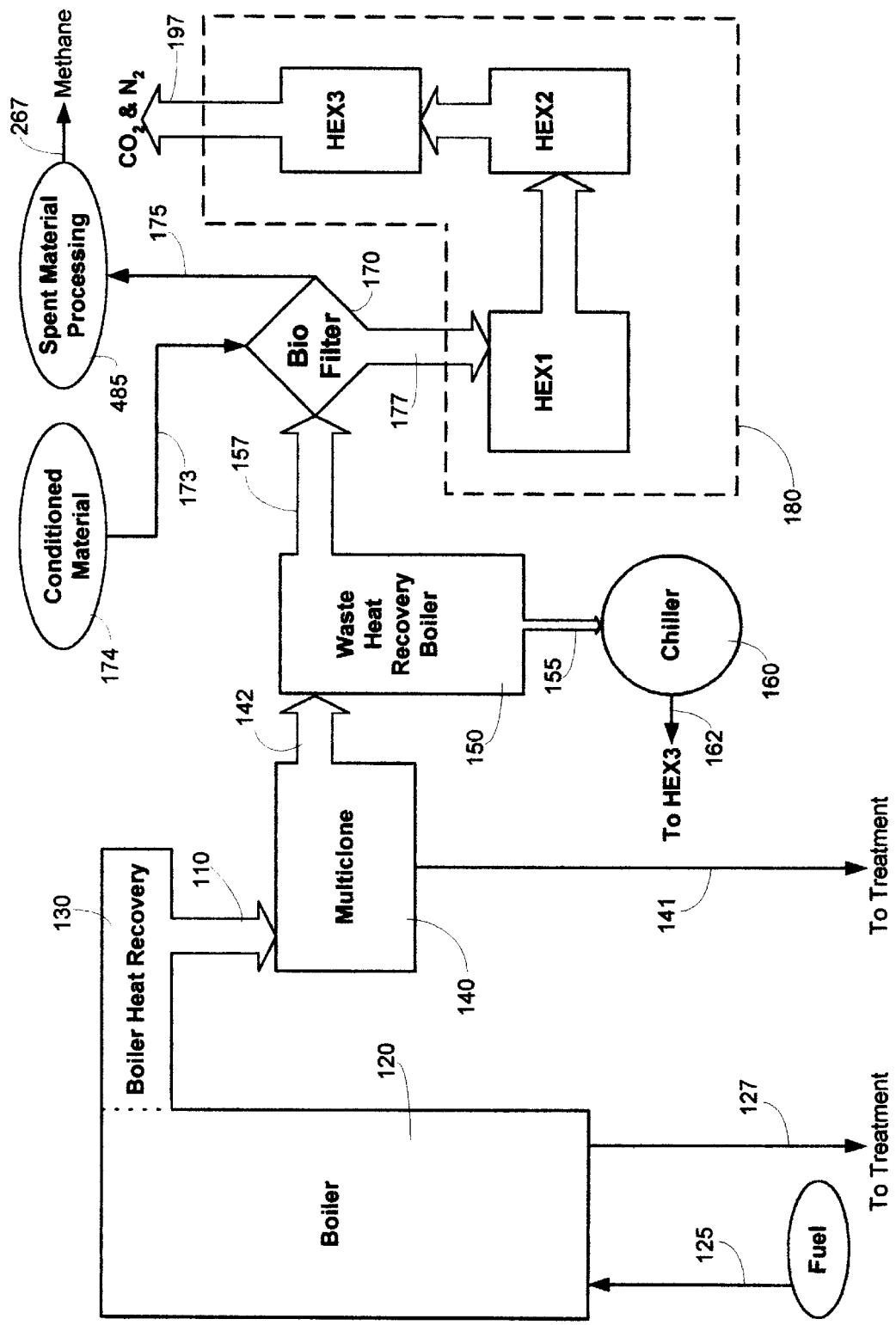
FIG. 1 is a schematic illustration of an overview of an embodiment of the present invention.

The invention provides a method and apparatus for removing undesired pollutants from flue gases generated by the combustion of a fossil fuel, by utilizing a moving filter of organic material. The purified gas from the biofilter can then be condensed to precipitate any remaining gaseous pollutants.
System Overview A preferred embodiment of the present invention is schematically shown in FIG. 1. The present invention is ideally suited to treat a combustion gas stream 110 from a boiler 120, that is conventionally configured for the combustion of a fuel stream 125, typically a solid fuel, such as coal. The boiler produces two waste streams. The blow down stream 127 can be either a solid or liquid stream and typically results from blow downs and may also include clinker removal or grate raking. The present invention is concerned however, with the flue gas 110. The flue gas emissions substantially contain all of the combustion product pollutants. The flue gas passes through a heat recovery stage 130 and then through a multiclone 140. The multiclone is a fly ash collection device, that is commonly employed in particulate material (PM) control systems for industrial solid fuel burning devices. The multiclone is preferably an array of mini-cyclones, each positioned in the combustion gas stream to remove the larger PM. The multiclone can be substituted with a wide variety of common gravity and centrifugal separators, but multiclone is often employed for this purpose. The multiclone produces a first fly ash waste stream 141 and a fly ash removed flue gas stream 142. After the multiclone removes most of the fly ash, the fly ash removed flue gas passes through a waste heat recovery boiler 150.

As also shown in FIG. 1 a chiller 160 is preferably utilized to effect waste heat recovery from a low pressure steam 155 generated by the waste heat recovery stage 150. This low pressure steam may have a temperature as low as approximately 220° F. and still be usable by the chiller. Most preferably, the chiller is a conventional steam absorption chiller that utilizes the low pressure steam as its absorption solution concentrator's heat source for refrigerating a chilled water stream 162. The chilled water stream can be utilized in other process stages, described later herein. As an alternative, a Stirling cycle engine (not shown) could be employed instead of or in addition to the steam absorption chiller. As an example, the Stirling engine employing low pressure steam could be utilized to power a reciprocating type refrigeration unit to thereby provide cooling for other process stages of the present invention.

After the waste heat recovery boiler 150, the fly ash removed flue gas stream 142, which has a temperature of approximately 300 to 500° F., becomes a reduced temperature fly ash removed flue gas stream 157. The reduced temperature fly ash removed flue gas stream preferably has a temperature of approximately 200° F. and is now ready for introduction into a biofilter 170. The biofilter is a filter stage that is detailed in FIG. 4. The biofilter includes a filter chamber 171 that houses a filter 172 for removing substantially all of the remaining PM in the reduced temperature fly ash removed flue gas stream.

The biofilter 170 receives an organic material stream 173, which is employed within the biofilter to remove PM from the reduced temperature fly ash removed flue gas stream 157. The conditioned material stream is a conditioned material 174, as shown in FIG. 1, and is preferably processed on-site or can alternatively be brought in from a remote operation. The conditioned material can be a great variety of biomass materials; residential lawn debris, agricultural by-products, land clearing debris, certain industrial and municipal wastes are all examples of materials that can be conditioned to be employed in the present invention.

As noted above, the reduced temperature fly ash removed flue gas stream 157 is still at a substantially high temperature of approximately 200° F. This high temperature is desirable to kill most pathogens that may remain in the conditioned material 174. This high temperature sterilization allows for the utilization of a greater variety of conditioned materials.

The biofilter 170 shown in FIG. 1, produces a spent organic material 175 as a waste product. The spent organic material is preferably transported off site for conversion for use in any one of a variety of subsequent uses. After conversion, one possible use for the organic material is for a plant growth media, or potting soil. The biofilter effectively removes substantially all remaining PM from the reduced temperature fly ash removed flue gas stream 157, to produce a cleaned flue gas 177.

The cleaned flue gas 177, though now substantially free of PM pollutants, still contains substantially all of the gaseous pollutants originally present in the flue gas 110 as emitted from the boiler 120. As such, the cleaned flue gas may be introduced to a conventional gaseous pollutant removal stages or, as preferred in an alternative of the present invention, introduced to a heat removal stage 180, as schematically shown in FIG. 1 and detailed in FIG. 6. A primary purpose of the heat removal stage is to remove gaseous air pollutants from the cleaned flue gas, including oxides of sulfur ($SO_x$), through a series of heat removal steps. The heat removal stage preferably includes a cascade of heat exchangers and is shown in further detail in FIG. 6. The heat removal stage condenses and processes the flue gas to produce a carbon dioxide ($CO_2$) and nitrogen gas ($N_2$) stream, which are referenced as "cool clean" gas 197.

Boiler

Figure 2:
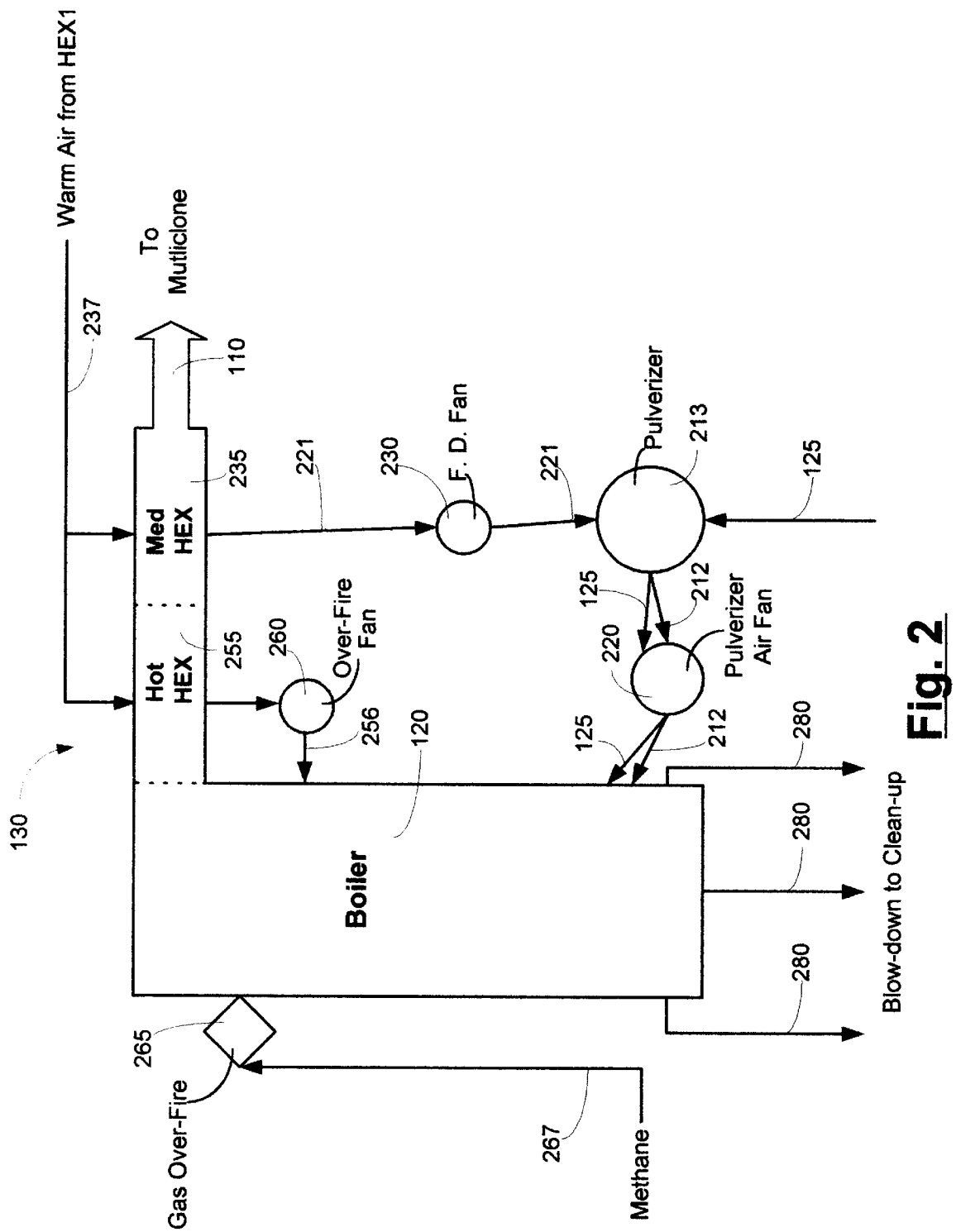
FIG. 2 is a schematic illustration of a portion of an embodiment of the present invention.

The boiler 120, as generally shown in FIG. 1, is detailed in FIG. 2. The fuel stream 125 includes pulverized coal 212 exiting from a pulverizer 213 and is injected into the boiler by a pulverizer injecting fan 220. The pulverizer injecting fan also injects a preheated primary air stream 221 into the pulverizer, which is introduced from a primary forced draft fan 230.

The heat recovery stage 130 of the boiler 120 preferably includes a medium temperature heat exchanger 235, also noted and referred to herein as "medhex". medhex is an air-to-air heat exchanger. The medhex utilizes the combustion gas stream 110, as exhausted from the boiler to preheat a warm air stream 237 to produce the preheated primary air upstream for introduction to the primary forced draft fan 230, as shown in FIG. 2 or alternatively into the pulverizer injecting fan 213.

The heat recovery stage 130 of the boiler 120 preferably includes a high temperature heat exchanger 255, also noted and hereinafter referred to as hothex, is preferably installed upstream and in series with the medhex 235, as also detailed in FIG. 2. Like medhex, the hothex is preferably an air-to-air heat exchanger that also preheats the warm air stream 237, to provide preheated air rather than ambient air as a secondary combustion air 256 to the boiler via an over fire air fan 260.

Additionally, as shown in FIG. 2, an over fire gas blower 265 can be utilized to pressurize a methane gas 267. The methane gas can be provided as a by-product of a conversion process that includes anaerobically digesting the spent organic material 175. This methane gas can be fed into the over fire gas blower, which is preferably fed as an over-fire stream to the boiler, as shown in FIG. 2, to improve combustion efficiency.

Also, a blow down stream 280, as well as other dirty steam or hot water waste heat sources that are exhausted under pressure from the boiler and the water treatment system are sent off site to clean up operations. These dirty streams may also be included in the conversion process that utilizes the spent organic material.

Multiclone

Figure 3:
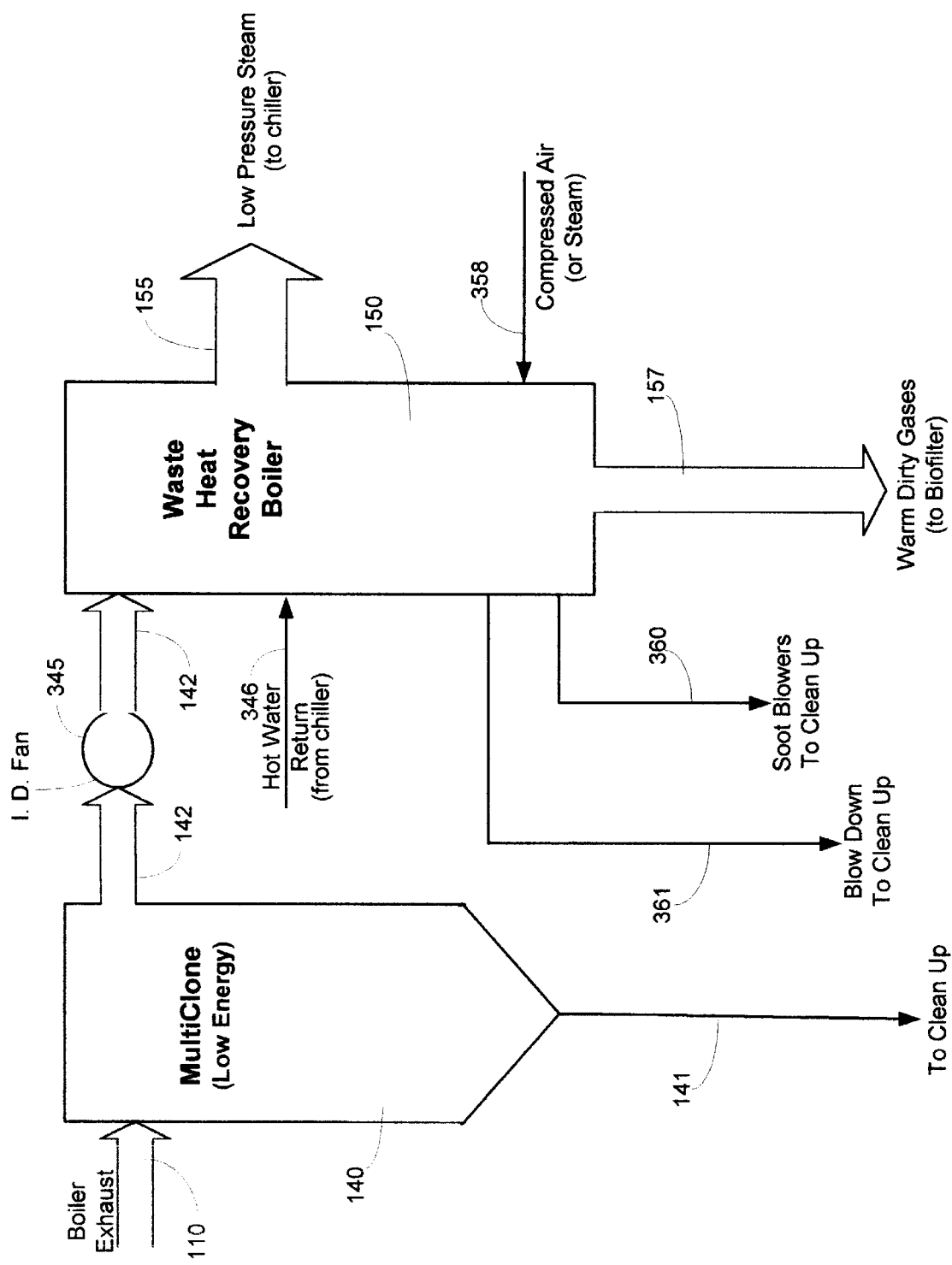
FIG. 3 is a schematic illustration of a portion of an embodiment of the present invention.

The present invention preferably employs a unique adaptation of a conventional multiclone. Typically, flue gas clean-up systems require maximum pressure drop and horse power (hp) at this stage. This need for high efficiency is because fine PM may plug up or cause damage to down stream components. Higher efficiencies result in exponential increases in fan hp. The approach of the present invention is projected to reduce the hp normally required by the multiclone by a factor of ten. For the present invention, all that is required at a multiclone stage 140, as detailed in FIG. 3, is to remove the large PM or first fly ash stream 141.

Figure 4:
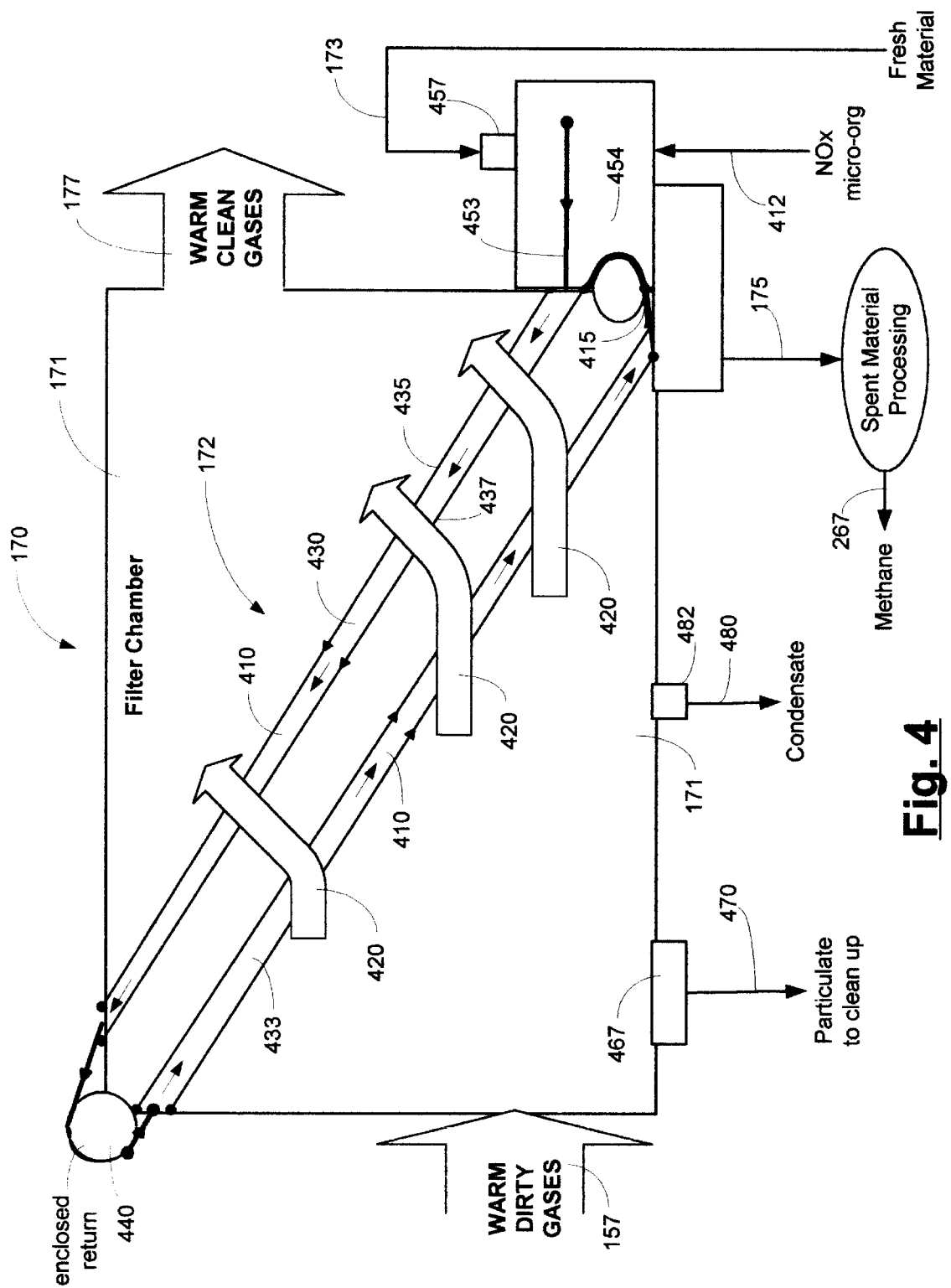
FIG. 4 is a schematic illustration of a portion of an embodiment of the present invention.

In a conventional boiler system, multiclones are operated at full capacity independent of the fuel being provided to the boiler. In the present invention, a feed-forward system is preferably utilized that transmits data indicating the ash content of the fuel going into the boiler 120. The percentage of ash determines the capacity at which the multiclone is operated since the fibrous organic mat PM filter, or the biofilter 170 as schematically detailed in FIG. 4, provides removal capabilities of all remaining fly ash. The first fly ash stream 141 from the multiclone is then conveyed to a treatment or disposal site.

An induced draft fan 345 pulls the exhaust stream from the boiler 120 through the multiclones 140 and forces the exhaust stream, which is the fly ash removed flue gas 142, through downstream processing stages.

Waste Heat Recovery Boiler

FIG. 3 also shows the waste heat recovery boiler 150 that receives the fly ash removed flue gas 142. By close coupling the waste heat boiler to an absorption chiller 160, shown in FIG. 1, maximum BTU's can be recovered. This approach will allow the use of steam as low as approximately 0.5 psig without affecting the efficiency of the absorption chiller. Another unique energy saving feature of the present invention is to use water to clean the flue gas side of the waste heat recovery boiler and then utilize the dirty water in downstream processes, thereby eliminating a water clean up requirement.

As detailed in FIG. 3, an induced draft fan (I.D. Fan) 345 forces the fly ash removed flue gas 142 through the waste heat recovery boiler 150. The waste heat recovery boiler is only required to produce a low pressure steam 155, preferably at 1 psig, or less. The low pressure is desirable, because with a lower steam pressure, more heat can be removed from the fly ash removed flue gas. The waste heat boiler is close coupled to the steam absorption chiller 160. To minimize pressure drop, the stream of low pressure steam exits the waste heat boiler through a large diameter pipe, preferably having a diameter of approximately 48 inches or more. After the low pressure steam condenses within the chiller it returns as a hot water return stream 346 to the waste heat recovery boiler where it is again heated and re-evaporated into the low pressure steam.

As employed in the boiler 120, compressed air or steam feeding a soot blower (not shown) removes fly ash from the exhaust stream side of the waste heat boiler 150 tubes, producing a waste stream 360, which can be conveyed off site to clean up. The effluent from a blow down system is also sent to a clean up system. The large PM removed will be processed through the clean up system, where it is converted and mixed with other materials to make a marketable product. All of the many waste streams are preferably processed through a common clean-up system.

Steam Absorption Chiller

The chiller 160, shown schematically in FIG. 1, can be close coupled to the low pressure heat recovery boiler 150. The steam 155, with a pressure as low 0.5 psig can be converted by the absorption chiller into cold water essentially independent of the temperature or pressure of the source. The result is the ability to use the very low pressure steam, which otherwise would have to be disposed of in a cooling pond (not shown). As the cooling pond temperature increases, the efficiency of the power-plant's condensing steam turbine (not shown) decreases. The result is less electricity at the plant's busbar (not shown). Again at this stage the approach has changed a negative into a benefit. This is the stage where a large amount of water is condensed. As it condenses, it also brings with it the remaining $SO_x$ and other condensables, which are also removed. These liquids are processed through the clean up system, which allows the entire plant to have "zero" discharge.

Organic Mat Biofilter

Further processing of the boiler exhaust 110 after the multiclone 140 assures that any potential hazardous substances are removed from the fly ash removed flue gas 142. The heart of the approach is the biofilter 170 that includes a mat 410, as shown in a preferred embodiment in FIG. 4. The mat is a disposable filter, preferably composed of finely chopped wet and sticky bio-mass. The biofilter is a low pressure drop system, which requires very little fan hp. The density, size or PM loading does not affect the efficiency of the biofilter. A reason the disposable mat is cost effective, is it and all the PM and condensables collected by it can be further processed by anaerobic digestion to produce methane gas 267, which can then be utilized through the over-fire gas blower 265 to deliver an additional heat source to the boiler 120, as previously discussed herein.

It is known that there are micro-organisms which essentially digest oxides of nitrogen ($NO_x$), converting them into harmless gas and other components. As an option, the mat 410 of the biofilter 170 can be amended with a stream of $NO_x$ micro-organisms 412 to provide the mat with a sufficient quantity of these $NO_x$ digesting organisms to substantially reduce or eliminate the $NO_x$ from the warm dirty gas stream 157, which is also referred to herein as the reduced temperature fly ash removed flue gas. The key to the use of these organisms is providing an adequate substrate for them to be held in the air stream. The mat is a suitable substrate because it has an enormous surface area, especially when compared to conventional filter media. The mat provides ideal living spaces and sites for the micro-organisms, or "bugs". After use the mat and the micro-organisms are all discharged as the spent organic material 175, to be processed through off site utilization that may include reclamation.

In summary, the mat 410 removes substantially all of the PM, some condensables, $NO_x$ via micro-organisms, and begins the removal of $SO_x$. As shown schematically in FIG. 4, the mat of the biofilter 170 is mounted on a movable filter frame 415. Change in loading of PM in the warm dirty gas stream 157 is compensated by simply changing the speed of the upper conveyor 430 and lower conveyor 433. Additionally, besides trapping fine PM, the organic material of the fibrous compost mat can be reprocessed to also have a sufficient moisture content to entrain the $SO_x$ present within the warm dirty gas stream.

The movable filter frame 415 sequentially presents the continuous mat 410 to the combustion gas stream 157, forcing the flue gas stream to pass through the mat. FIG. 4 shows the warm dirty gases passing through the mat in the direction of gas path arrows 420. The filter chamber 171 of the biofilter 170 is preferably sealed to allow the gases to expand into a large cavity to lower its velocity to approximately 100 feet per minute. This slow velocity allows substantially all of the remaining large PM to fall out. The warm dirty gasses gases are forced through the slowly moving wet and sticky fibrous mat. The mat is composed of chopped organic materials, which has an effective surface area over 1,000 times as large as an equal thickness of typical fabricated filter media. This large wet surface area provides for a very effective trap of PM.

As also shown in FIG. 4, the mat 410 includes an upper conveyor 430 and a lower conveyor 433. The mat is formed at a feeder box 454 and evenly distributed across the width of the sealed filter chamber 171 in a uniform thickness of approximately 12 inches, on the upper conveyor. The upper conveyor preferably includes a top mesh 435 positioned above the upper mat and a bottom mesh 437 positioned below the mat. The upper mat preferably travels upward in a diagonal fashion and directs the mat through a reverser-and-inverter mechanism 440 which inverts the mat onto the lower conveyor 433 which is moving downward in a diagonal fashion. The upper conveyor and the lower conveyor both preferably have a mesh surface fabricated from a corrosion resistant metal or plastic.

As shown in a preferred embodiment in FIG. 4, the mat 410 first feeds to the upper conveyor 430 and the warm dirty gasses 157 first enter the filter chamber 171 to encounter the portion of the mat on the lower conveyor 433. The warm dirty gases, which contain the highest concentration of PM, always first pass through the mat surfaces which already have entrapped PM. As PM is removed via the passage of the gases through the mats, the exhaust stream moves through the mat portion on the upper conveyor, which has mat surfaces that are substantially free of trapped PM. Prior to exiting the mats all PM have effectively and substantially been entrapped within the body of the mats. This allows PM-free exhaust or warm clean gasses 177 to exit the biofilter 170 through a clean mat surface, to an air duct.

Preferably, the speed of the mat 410 is regulated by monitoring a pressure differential across the biofilter 170. As the loading of the mat increases, resistance to flow and the pressure drop across the biofilter also increase. The speed of the upper conveyor 430 and the lower conveyor 433 are then incrementally increased until the pressure drop falls to its nominal level.

Figure 5:
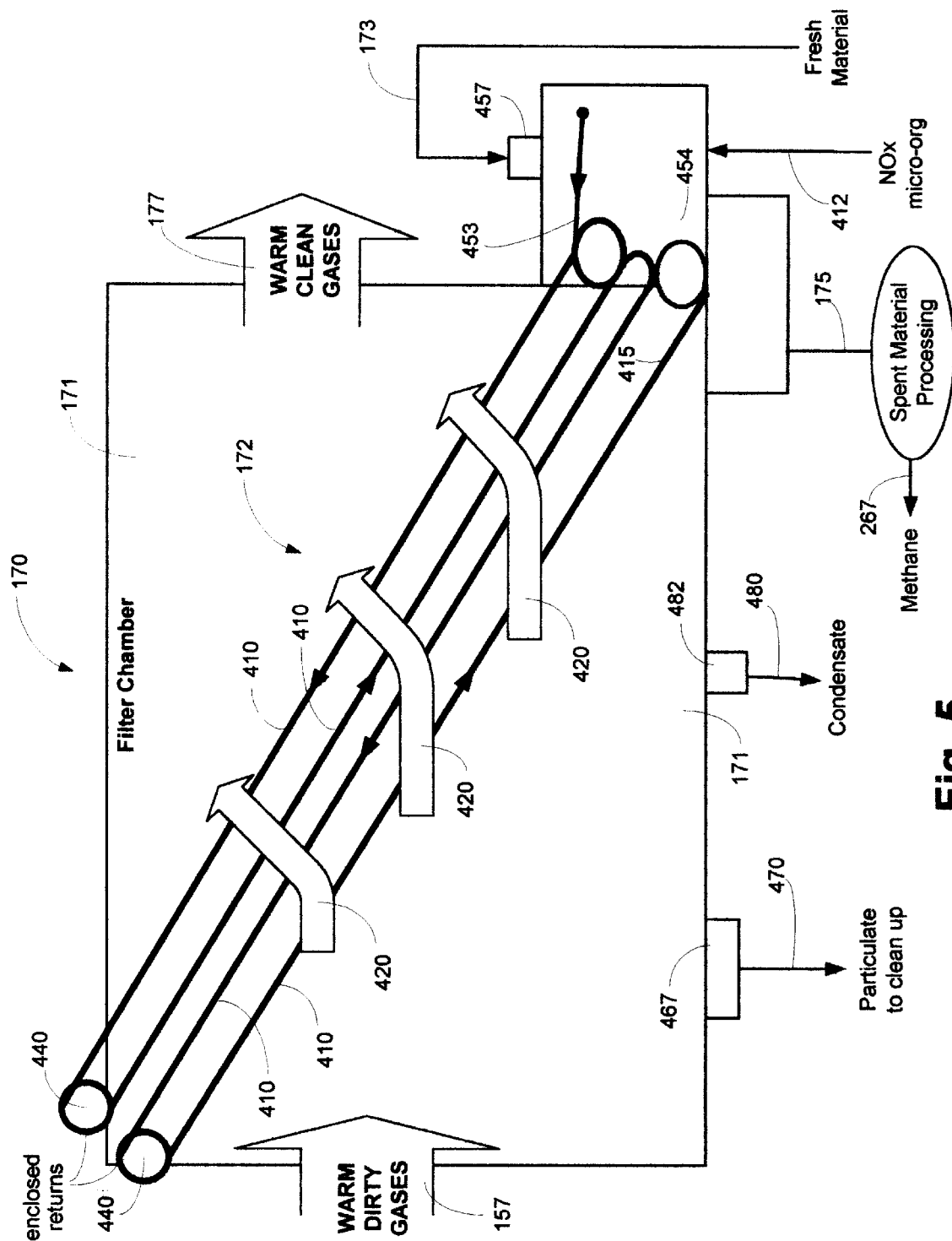
FIG. 5 is a schematic illustration of a portion of an embodiment of the present invention.

In an alternative embodiment, as shown in FIG. 5, the biofilter 170 employs a quadruple pass mat system. The movable filter frame 415 is configured to re-return pass the mat 410 through the warm dirty gas stream 157. Again, the warm dirty gases, which contain the highest concentration of PM, always first pass through the mat surfaces which already have entrapped PM. As PM is removed via the passage of the gases through the mats the exhaust stream moves through successively cleaner surfaces of the mats. Prior to exiting the mats all PM have effectively and substantially been entrapped within the body of the mats. The mat moves in four steps to the dirty inlet air side, where it may become heavily loaded with PM. This serpentine routing of the mat allows PM-free exhaust or warm clean gasses 177 to exit the biofilter 170 through a clean, virgin surface.

As a further alternative based upon the biofilter 170 shown in FIG. 4, an upper divider mesh (not shown) can be used to separate the mat 410 of the upper conveyor 430 into an upper layer and lower layer of equal thickness. A lower divider mesh, (not shown) can also be utilized to separate the mat 410 of the lower conveyor 433 into an upper layer and a lower layer of equal thickness. The lower layer of the lower conveyor mat, which has trapped the most PM, is preferably compressed into a thickness of less than 2 inches and exits the sealed filter chamber 171 through a 2 inch slot, which is preferably sealed with an air curtain (not shown). The pressure of the air curtain is sufficient to prevent any leakage of exhaust gases from the sealed filter chamber.

The mat 410 is first placed onto the upper conveyor 430 at a mat infeed 453 from a feed chamber 454. The feed chamber, like the filter chamber 171 is preferably sealed and has an internal pressure equal to the pressure in the sealed filter chamber. The fresh material 173 is received in the sealed feed chamber through an air lock 457. A distributor (not shown) uniformly distributes the fresh material on the moving mat. The PM is subsequently trapped in the mat material and removed.

The sealed filter chamber 171 is designed so that pressure differentials and gas velocities across the mat 410 is sufficiently low as to prevent "blowout". Blowout is the term used to describe when a hole created in a filter, allowing PM to blow through the filter and out of the filter housing.

Preferably, a mechanical scraper (not shown) is utilized to move to the side of the filter chamber 171 those PM that have collected on the floor near the inlet duct. The PM preferably falls into a screw conveyor (not shown) that conveys the material to an air lock 467, for removal from the filter chamber. This PM is a second fly ash stream 470 that is preferably combined with the first fly ash stream 141 and then transported "across the fence", or off site, to clean up.

It is possible that the dew-point of the warm dirty gasses 157 is higher than the temperature of the mat 410. In this case a condensate 480 will fall into a sump 482 on the floor of the filter chamber 171, where a sump pump (not shown) can be utilized to pump the condensate to clean up.

The methane gas 267 that can be produced by the anaerobic digestion of the spent material 175, is a "biogas", a combination of gasses primarily comprising of methane and carbon dioxide. This spent material processing 485 can also include the processing of the acidic condensate stream 480 from the biofilter and heat removal stage 180, primarily comprising water.

Final Heat Removal

The very clean, PM free exhaust stream 177 leaves the biofilter 170 saturated with water in which the $SO_x$ and other condensables are readily dissolved. The temperature at this stage is still high enough to use the site's cooling pond (not shown) and/or boiler make-up water (not shown) as a source of cooling. By reducing the temperature of the PM free flue gas stream, additional gaseous pollutants can be removed. This removal is accomplished in the heat removal stage 180, which is further detailed in FIG. 6. The condensed liquids from this stage are processed through the clean up system.

Figure 6:
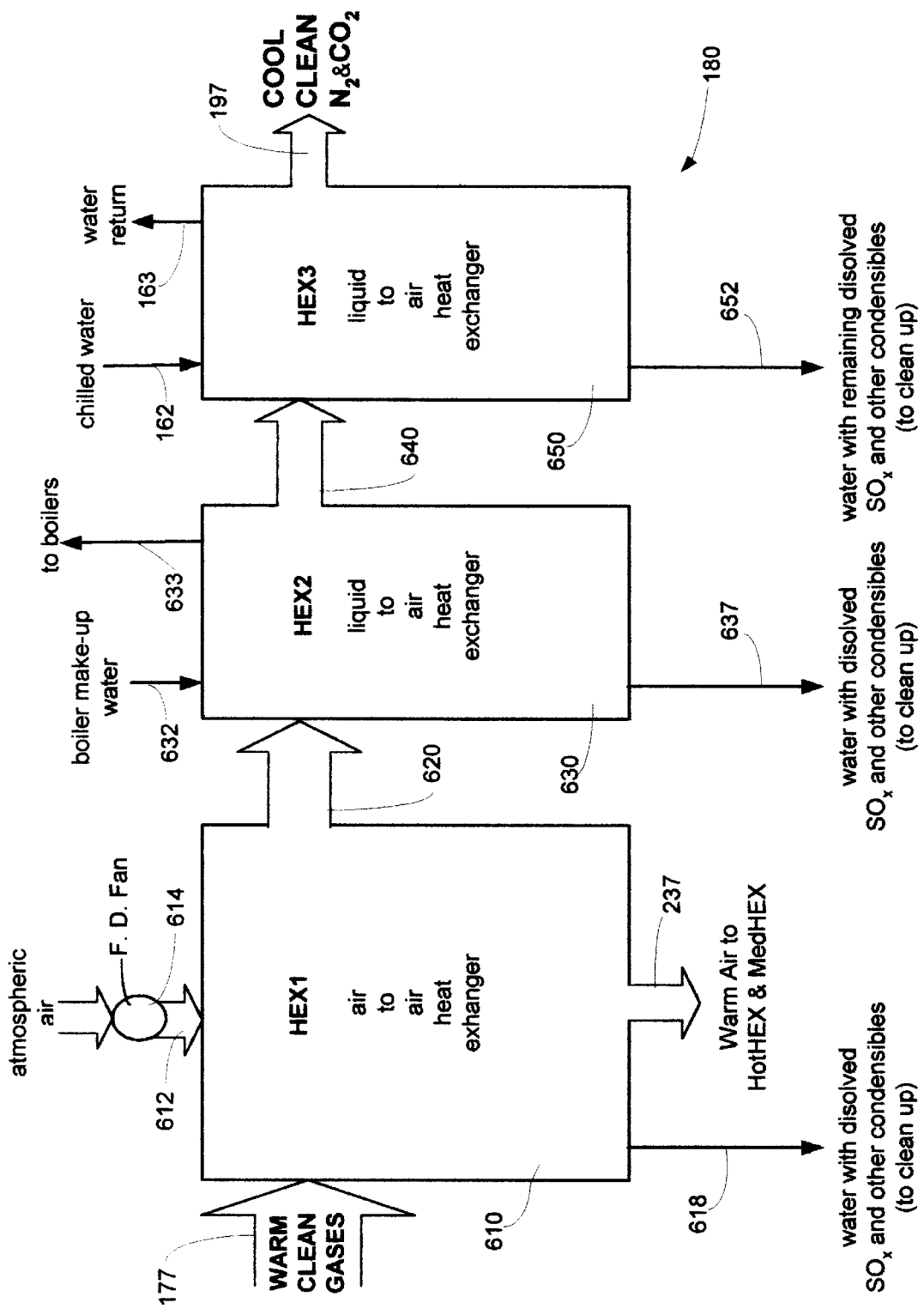
FIG. 6 is a schematic illustration of a portion of an embodiment of the present invention.

A first heat exchanger 610, which is an air-to-air heat exchanger referenced as "hex1" in FIGS. 1 and 6, receives the PM free exhaust gases 177, which are referenced as "clean warm gases." An atmospheric air stream 612 is forced through the hex1 via a fan 614. The heated atmospheric air is preferably utilized as the warm combustion air stream 237, which is supplied to the inlet of the air preheaters, medhex 235 and hothex 255 of the boiler 120, as shown in FIG. 2. The purpose of hex1 is to lower the temperature so that additional condensate will form. The water vapor, gaseous $SO_x$ and other condensables coalesce simultaneously into a first condensable stream 618, which includes most of the remaining $SO_x$ present in the clean warm flue gas, now dissolved in the first condensable stream. This first condensable stream is primarily water, which is preferably removed from the air-to-air preheater through a water trap and then into a manifold where it is pumped off site to clean up. The hex1 produces a first cooled and PM free exhaust gas stream 620, as shown in FIG. 6.

A second heat exchanger 630, which is noted as "hex2" in FIGS. 1 and 6, receives the first cooled PM free exhaust gas stream 620 from hex1. hex2 is a liquid-to-air heat exchanger, as also shown schematically in FIG. 6. Preferably, as the exhaust stream is forced through the air side of hex2, water from a boiler pretreatment supply 632 is cycled through the liquid side of hex2 and sent to a boiler hot well stream 633. The water vapor, gaseous $SO_2$ and other condensables coalesce simultaneously into liquid with the $SO_2$ dissolving in the condensed water. This water is preferably removed from the hex2 through a water trap (not shown) and then into a manifold (not shown), where it is pumped off site to cleanup 637.

A second PM free and further cooled exhaust gas stream 640 from hex2 is forced through a third heat exchanger, noted herein as "hex3" 650. hex3 is a liquid-to-air heat exchanger that is schematically shown in FIG. 6. Chilled water 162 from the steam absorption chiller 160 circulates through the liquid side of hex3 and is then returned 163 to the chiller. A water pump (not shown) circulates the chilled water stream 162 from the chiller 160, which is preferably, as previously mentioned, a steam absorption chiller. The water pump preferably circulates the chilled water, which can be any conventional fluid refrigerant medium, in a closed loop through the hex3 650, which is a liquid-to-air heat exchanger, shown in FIG. 6. The water vapor, gaseous $SO_x$ and other condensables coalesce simultaneously into liquid with the $SO_x$ dissolved in the water. This water is removed from the liquid-to-air preheater through a water trap and then into a manifold where it is pumped off site 652, to clean up.

The third cooled and PM-free exhaust gases 197 exiting the second liquid-to-air heat exchanger, hex3 650 are a mixture of nitrogen ($N_2$) and carbon dioxide ($CO_2$) cooled to a temperature of 50° F. or less. At these conditions the carbon dioxide can be liquefied at lower energy expenditure than with conventional methods. Liquid $CO_2$ can be pumped into tank cars and transported off site.

$CO_2$ is both an industrial gas and when released to the atmosphere, a major greenhouse gas. This total plant, total environmental impact approach, results in the only known economical method of collecting and liquefying $CO_2$. Prior to this stage, the hot dirty emissions have been cleaned and cooled to below atmospheric temperature.

$CO_2$ can be liquefied with a combination of increasing pressure and lower temperature. Our process starts with cool, approximately 50° F. gas, which is approximately 15% $CO_2$ and the remainder nitrogen. A unique feature of this process, is the availability for the large amount of cool nitrogen gas to be used as a low temperature heat sink for the liquefaction of the $CO_2$ at approximately 20° F. and approximately 100 psig.

A gas liquefaction facility utilizing the heat removal stage 180 of the present invention, may use as little as one tenth the amount of energy (electricity) of existing $CO_2$ production plants. The greatest cost associated with $CO_2$ is the energy input (electricity) the next is transportation, which is usually trucks. Most large coal fired plants have rail car access. They also have empty trains of coal cars crossing many areas of the country. A few loaded cars of piggy back $CO_2$ trailers could be moved to many locations in the U.S. at very low energy impact and at significantly reduced cost when compared to local production.

The emissions clean-up approach of the present invention allows most, if not all coal plants to burn high sulfur eastern coal rather than hauling western coal an additional 1,000 miles or farther. The result will be coal coming from areas closer to the populated areas of the eastern U.S. This will also allow the low cost transportation of the $CO_2$ to more existing markets.

Additional applications of the present invention could include asphaltic or heavy crude oil burning plants, or process waste or by-product streams that can be utilized in the combustion units of refineries, mines or chemical processing plants.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible which employ the same inventive concepts as described above. Therefore, the invention is not to be limited except by the following claims, as appropriately interpreted in accordance with the doctrine of equivalents.

What is claimed is:

1. A biofiltration apparatus for removing air pollutants from a combustion gas stream which includes:
   a filter for removing particulate material from a combustion gas stream,
   the filter positioned within the combustion gas stream,
   the filter comprising a continuous mat of a substantially organic material, the organic material having a sufficient moisture content and surface area to entrain substantially all of the particulate material present in the combustion gas stream,
   the filter mounted on a movable filter frame, and
   the movable filter frame for sequentially presenting the continuous mat to the combustion gas stream and for forcing the combustion gas stream to pass through a portion of the continuous mat.

2. The biofiltration apparatus of claim 1, wherein the organic material includes a $NO_x$ digesting organism for substantially reducing or eliminating the $NO_x$ from the combustion gas stream.

3. The biofiltration apparatus of claim 1, wherein the organic material is a fibrous material.

4. The biofiltration apparatus of claim 1, wherein the movable filter frame is configured to return the continuous mat through the gas stream for a second pass.

5. The biofiltration apparatus of claim 1, wherein the combustion gas stream is generated from the combustion of a solid fuel.

6. The biofiltration apparatus of claim 1, wherein the combustion gas stream is generated from the combustion of a coal based fuel.

7. The biofiltration apparatus of claim 1, wherein the combustion gas stream is generated from the combustion of a liquid fuel.

8. The biofiltration apparatus of claim 1, further comprising a heat removal stage for condensing gaseous pollutants from the gas stream.

9. The biofiltration apparatus of claim 8, wherein:
   the heat removal stage includes a minimum of a single heat exchanger,
   the heat exchanger including a refrigerated cooling medium for removing heat from the gas stream and for producing a substantially pollutant free gas stream.

10. The biofiltration apparatus of claim 9, wherein:
    an absorption chiller is included for utilizing a waste heat from the combustion gas stream to generate a chilled water stream as the refrigerated medium in the heat removal stage.

11. The biofiltration apparatus of claim 8, wherein a waste heat from the combustion gas stream is utilized to produce a refrigerated cooling medium for further cooling the combustion gas stream.

12. A method for removing air pollutants from a combustion gas stream with a biofilter which includes the steps of:
    a) mounting a filter on a movable filter frame,
       the filter comprising a continuous mat of a substantially organic material, the organic material having a sufficient moisture content and surface area to entrain substantially all of the particulate material present in the combustion gas stream,
    b) positioning the filter within a combustion gas stream,
    c) moving the filter frame to sequentially present the continuous mat to the combustion gas stream; and
    d) forcing the combustion gas stream to pass through a portion of the continuous mat.

13. The method of claim 12, with the additional step of:
    e) entraining substantially all of the particulate material present in the combustion gas stream.

14. The method of claim 12, wherein the step of moving the filter frame includes returning the continuous mat through the gas stream.

15. The method of claim 12, with the additional steps of:
    e) removing heat from the gas stream; and
    f) condensing gaseous pollutants from the gas stream.

* * * * *